United States Patent [19]
Hirosaka et al.

[11] Patent Number: 5,805,637
[45] Date of Patent: Sep. 8, 1998

[54] AUTOMATIC EQUALIZER AND DIGITAL SIGNAL REPRODUCING APPARATUS CARRYING THE SAME

[75] Inventors: Hisato Hirosaka, Tokyo; Akio Tanaka, Kanagawa, both of Japan

[73] Assignee: Sony Corporation, Tokyo, Japan

[21] Appl. No.: 719,624

[22] Filed: Sep. 25, 1996

[30] Foreign Application Priority Data

Sep. 29, 1995 [JP] Japan ................................... 7-254259
Sep. 29, 1995 [JP] Japan ................................... 7-276891

[51] Int. Cl.⁶ .............................. H03H 7/30; H03H 5/00; G06F 17/10; G11B 5/035
[52] U.S. Cl. ...................... 375/230; 375/229; 264/724.2; 360/65; 333/28 R
[58] Field of Search ................................... 375/230, 232, 375/262, 341, 350, 229; 360/65; 371/43.1; 364/724.2; 333/28 R, 152

[56] References Cited

U.S. PATENT DOCUMENTS

| | | | |
|---|---|---|---|
| 4,044,381 | 8/1977 | Shimano et al. ........................ | 358/160 |
| 4,481,643 | 11/1984 | Kitazawa ................................... | 375/12 |
| 4,745,623 | 5/1988 | Sebald et al. .............................. | 375/14 |
| 5,224,123 | 6/1993 | Okanoue ................................... | 375/95 |
| 5,486,956 | 1/1996 | Iga et al. ................................... | 375/14 |
| 5,487,085 | 1/1996 | Wong-Lam et al. ..................... | 375/230 |

FOREIGN PATENT DOCUMENTS 0682414  6/1995  European Pat. Off. ....... H03M 13/12

*Primary Examiner*—Chi H. Pham
*Assistant Examiner*—Khai Tran
*Attorney, Agent, or Firm*—Jay H. Maioli

[57] ABSTRACT

An automatic equalizer having a high convergence performance and broad pull and lock ranges. In converting playback signals into multi-level signals, a transversal filter output is processed with maximum likelihood decoding using a maximum likelihood decoder for calculating transmission errors and the coefficients of the transversal filter are again set based on the calculated errors.

16 Claims, 11 Drawing Sheets

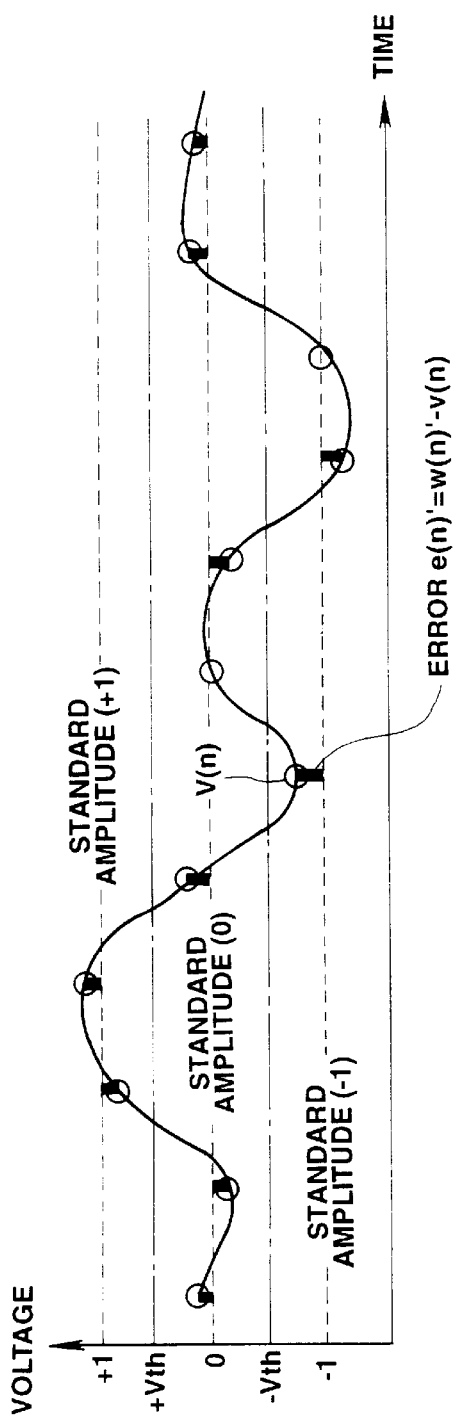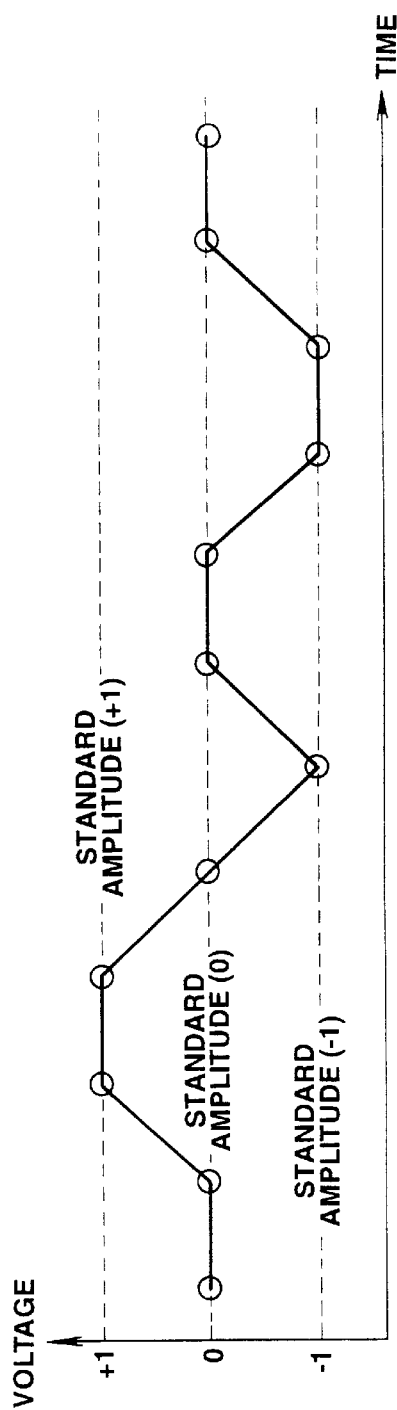
FIG.2A (PRIOR ART)
FIG.2B (PRIOR ART)

AUTOMATIC EQUALIZER AND DIGITAL SIGNAL REPRODUCING APPARATUS CARRYING THE SAME

BACKGROUND OF THE INVENTION

1. Field of the Invention

This invention relates to an automatic equalizer for adaptive waveform equalization of an input digital signal obtained on digital transmission, and a digital signal reproducing apparatus having such automatic equalizer.

2. Background of the Invention

Recently, an automatic equalizer has come into use on a reproducing side of a digital signal recording/reproducing apparatus, such as a digital audio tape recorder (DAT).

An example of the digital signal recording/reproducing apparatus, employing such automatic equalizer, is shown in FIG. 1.

A string of transmission data $\{w(n)\}$, recorded on a recording medium, is supplied via an input terminal 201 of FIG. 1 to a recording/reproducing system 202, such as the above-mentioned DAT. An impulse response series of the recording/reproducing system 202 is $\{g(n)\}$. An input signal string supplied from the recording/reproducing system 202 to a transversal filter 204 of an automatic equalizer 203 is $\{q(n)\}$. This input signal string $\{q(n)\}$ is a signal obtained on sampling the RF signal reproduced from the recording medium in the recording/reproducing system 202 by e.g., A/D conversion at a channel clock timing. The automatic equalizer 203 is made up of the transversal filter 204, a transmission string prediction circuit 205, a tap coefficient calculation circuit 207 and an adder 206.

An output signal string of the transversal filter 204 is $\{v(n)\}$. A prediction transmission string $\{w(n)'\}$ of the transmission string prediction circuit 205 in the automatic equalizer 203 is $\{w(n)'\}$. A prediction error signal string $\{e(n)'\}$ is found by subtracting the output signal string $\{v(n)\}$ of the transversal filter 204 from the prediction transmission string $\{w(n)'\}$ of the transmission string prediction circuit 205. Based on this prediction error signal string $\{e(n)'\}$, the tap coefficient calculation circuit 207 calculates the tap coefficient of the transversal filter 204 and sends the tap coefficient thus calculated to the transversal filter 204. The output signal string $\{v(n)'\}$ from the transversal filter 204 is sent as an output of the automatic equalizer 203 to a detection circuit 208 for data detection. The detected data is taken out at an output terminal 209.

Since the input signal string $\{q(n)\}$ of the automatic equalizer 203 is the same as the convolution information of the transmission data string $\{w(n)\}$, it is given by the equation (1):

$$q(n) = \sum_{m=-\infty}^{\infty} g(n-m)w(m) \quad (1)$$

Since the output signal $v(n)$ of the transversal filter 204 is equal to the convolution integration of the input signal $q(n)$ and the filter tap coefficient $c_k(n)$, it is given by the equation (2):

$$v(n) = \sum_{k=0}^{K-1} c_k(n)q(n-k) \quad (2)$$

where K denotes the number of taps of the transversal filter 204.

Substituting the equation (2) into the equation (1), $$v(n) = \sum_{k=0}^{K-1} c_k(n) \sum_{m=-\infty}^{\infty} g(n-m-k)w(m) \quad (3)$$

$$= \sum_{m=-\infty}^{\infty} \sum_{k=0}^{K-1} c_k(n)g(n-m-k)w(m)$$

In the equation (3), the length of the impulse response of the transmission path is assumed to be infinite and the sum is taken from $-\infty$ to $\infty$. However, in effect, this length is finite.

The difference between the transmission data $w(n)$ and the output signal $v(n)$ of the transversal filter 204, that is an error $e(n)$, is calculated from the following equation (4):

$$e(n)=w(n)-v(n) \quad (4)$$

The theoretical error is given by the equation (4). However, the transmission data $w(n)$ is not known in advance. Therefore, the prediction transmission data $w(n)'$ is found on the basis of the result of transient detection of the output signal $v(n)$ of the transversal filter 204, and the prediction error $e(n)'$ is calculated from the following equation (5):

$$e(n)'=w(n)'-v(n) \quad (5)$$

FIGS. 2A and 2B illustrate an example of the output signal $v(n)$ of the transversal filter 204 and an example of the prediction transmission data $w(n)'$ obtained by the transmission string prediction circuit 205. The white circle ○ in FIG. 2A represents the output signal $v(n)$ obtained on A/D conversion of the reproduced RF waveform from the recording/reproducing system, while a white circle ○ in FIG. 2B represents the prediction transmission data $w(n)'$. The bold line in FIG. 2A represents the prediction error $e(n)'=(w(n)'-v(n))$.

The transmission string prediction circuit 205 generates a signal string of an ideal waveform which should have been obtained in the absence of the transmission noise or equalization errors, as shown in FIG. 2B. The transmission string prediction circuit 205 is used for finding the above error. The waveform of FIG. 2B shows an example of transmission by the so-called partial response class I (PRI). Since the PRI assumes three values, the detection threshold values (+Vth, −Vth) at the transmission string prediction circuit 205 may be set to, for example, +0.5V and −0.5 V, respectively, If the standard amplitudes are set to, for example, +1 V, 0 V and −1 V. The standard amplitude (+1) of FIG. 2B is an envelope of an RF waveform of the reproduced noise-free signal which has been equalized ideally, the standard amplitude (0) is 0 V and the standard amplitude (−1) is an envelope of the waveform of the reproduced noise-free signal equalized ideally and which is multiplied with (−1).

The tap coefficient calculation circuit in the automatic equalizer 203 adjusts the tap coefficient for reducing the prediction error $e(n)'$ to as small a value as possible.

If the predicted transmission data $w(n)'$ is substantially the same as the true transmission data $w(n)$, the prediction error $e(n)'$ is close to the true error $e(n)$, so that the automatic equalizer 207 operates correctly. If there is a significant difference between the predicted transmission data $w(n)'$ and the true transmission data $w(n)$, the predicted error $e(n)'$ becomes different from the true error $e(n)$, so that there arises the risk of malfunction of the automatic equalizer.

The malfunction of the automatic equalizer may be characterized by the following events:

(i) Even if some time has elapsed since the start of the operation, no signal convergence or scattering occurs, such that convergence occurs at a mistaken stable point.

(ii) The range of transmission channel characteristics with possible convergence, that is, the pull-in range, becomes narrow.

(iii) The required time until convergence is prolonged.

(iv) The convergence, once achieved, is disengaged.

(v) If transmission channel characteristics are deflected, follow-up cannot be achieved, such that scattering occurs. That is, the lock range becomes narrow.

The increased difference between the predicted transmission data w(n)' and the true transmission data w(n), as given above as the cause of malfunction, is ascribable to lowered precision in transient detection. However, in general, the following events are responsible for the lowered precision in transient detection:

(i) The transient detection circuit is poor in accuracy, while the circuit itself suffers from excessive noise.

(ii) the transmission channel suffers from excessive noise.

(iii) There is significant deviation from the ideal transient equalization characteristics, while the transient equalization error is larger.

That is, the automatic equalizer may be said to have latent instable factors resulting from formulation of the predicted transmission string therein.

The second problem to be solved by the present invention may be summarized as follows:

In the interior of the tap coefficient calculating circuit 207 of FIG. 1, it is necessary to perform multiplication of the predicted error e(n)' from the subtractor 206 with the input signal q(n) to the transversal filter 204 a number of times equal to the number of taps. If the bit length and the bit width of the input signal q(n) and the prediction error e(n)' are n, n×n calculations are required. However, since the multiplier is usually larger in circuit scale, it is necessary for the number of bits of multiplication of the multiplier for tap coefficient calculations to be small if it is desired to reduce power consumption of the device. However, the multiplier is generally larger in circuit scale. Therefore, if there is a demand for a lower power consumption, it is necessary to use a smaller number of bits of multiplication of the multipliers used for tap coefficient calculations.

SUMMARY OF THE INVENTION

It is therefore an object of the present invention to provide an automatic equalizer whereby transient detection accuracy in the automatic equalizer may be improved for preventing occurrence of malfunction in automatic equalization.

It is another object of the present invention to provide an automatic equalizer and a digital signal reproducing apparatus whereby the circuit scale of the multiplication circuit used for calculating the filter tap coefficient in the automatic equalizer may be diminished for reducing power consumption and cost.

In one aspect, the present invention provides an automatic equalizer including filter means for convolving an input digital signal with a coefficient, prediction means for performing maximum likelihood decoding on an output signal of the filter means based on a pre-set threshold value for predicting an original signal, error calculation means for calculating a prediction error based on an output of the prediction means and an output of the filter means, and coefficient generating means for generating the coefficients of the filter means based on the results of calculations by the error calculation means.

In another aspect, the present invention provides a signal reproducing apparatus including filter means for convolving an input digital signal with a coefficient, prediction means for performing maximum likelihood decoding on an output signal of the filter means based on a pre-set threshold value for predicting an original signal; error calculation means for calculating a prediction error based on an output of the prediction means and an output of the filter means, coefficient generating means for generating the coefficient of the filter means based on the results of calculations by the error calculation means, detection means for detecting original data based on an output of the filter means, and error correction means for correcting the errors of data detected by the detection means.

In yet another aspect, the present invention provides an automatic equalizer and a digital signal reproducing apparatus wherein, for simplifying the calculations in calculating filter coefficients, at least two coefficients are provided and switched depending on the sign of the prediction error signal from the error calculating unit.

BRIEF DESCRIPTION OF THE DRAWINGS

FIG. 2A shows the threshold voltage, reproduced RF signals, predicted transmission data and predicted error for converting the reproduced RF signals into three-level signals, as encountered in the conventional system.

FIG. 2B shows an ideal three-value output in case there is no disturbance, such as noise, during transmission.

DESCRIPTION OF THE PREFERRED EMBODIMENTS

Figure 1:
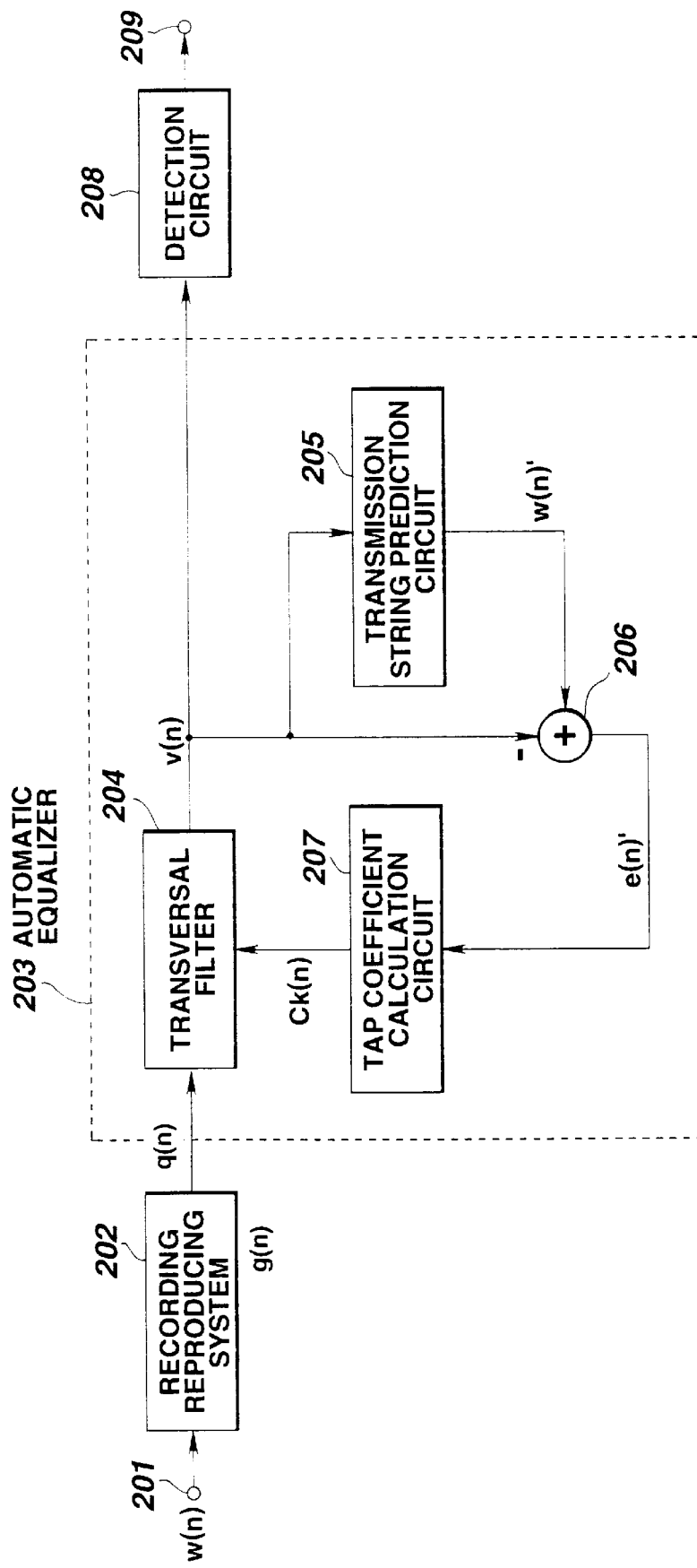
FIG. 1 is a block diagram showing a digital signal processing circuit as previously proposed.

Referring to the drawings, several preferred embodiments of the present invention will be explained in detail.

Figure 3:
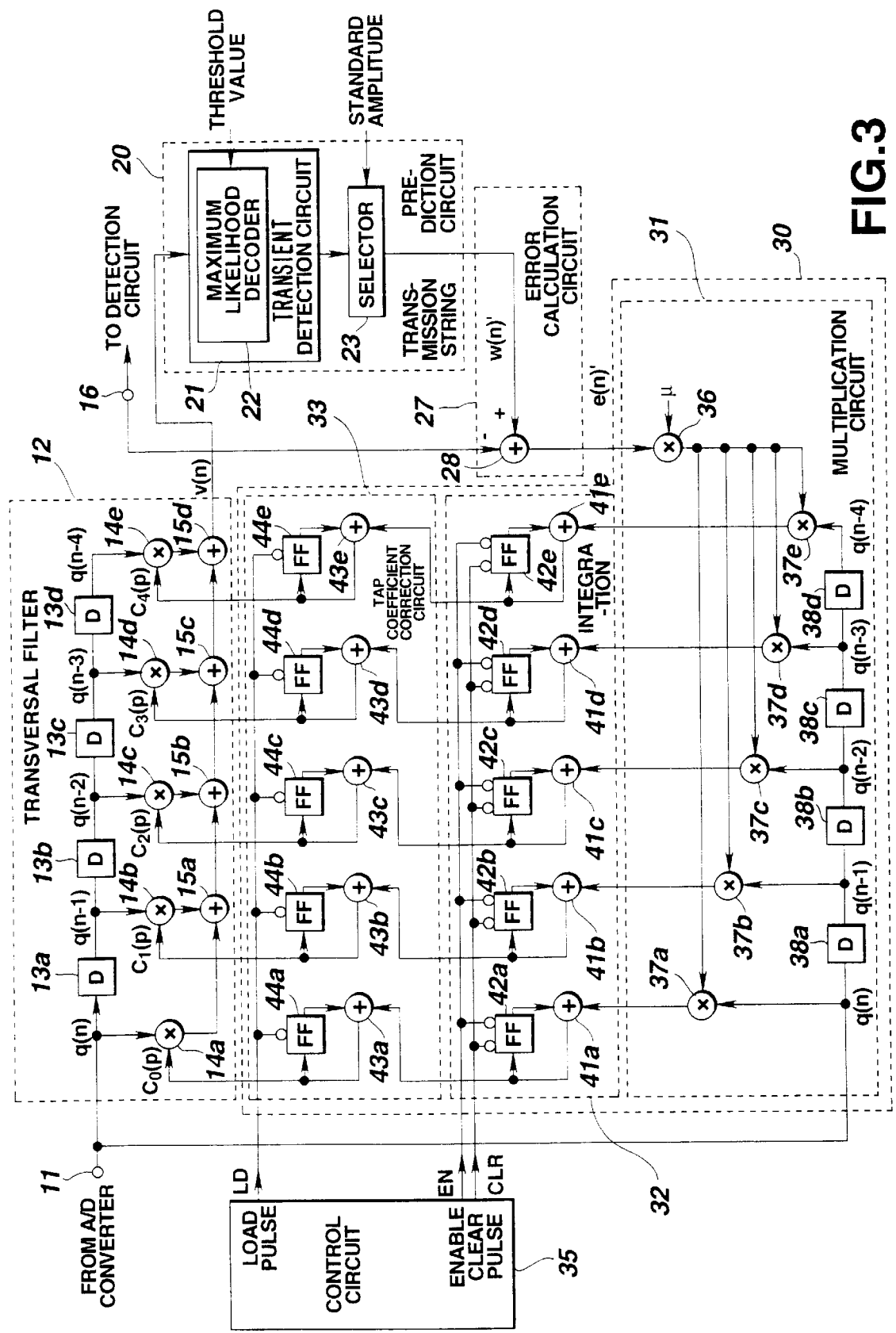
FIG. 3 shows details of the automatic equalizer according to the present invention.

FIG. 3 shows details of an automatic equalizer 203 according to a first embodiment of the present invention.

In FIG. 3, a digital input signal q(n), obtained on A/D conversion of a signal reproduced from a recording medium, is supplied to an input terminal 11 of the automatic equalizer. This input signal q(n) is sent to a transversal filter 12 which is the filter means for convolving the input signal string with the tap coefficients. In the embodiment of FIG. 3, a 5-tap transversal filter is shown. Specifically, in the transversal filter 12 shown in FIG. 3, the input signal q(n) and delayed versions of the input signal q(n-1), q(n-2), q(n-3) and q(n-4), sequentially delayed by four delay circuits 13a, 13b, 13c and 13d, are supplied to multipliers 14a, 14b, 14c, 14d and 14e, respectively, so as to be multiplied by tap coefficients c0(p), c1(p), c2(p), c3(p) and c4(p), respectively. The results of multiplication are sent to adders 15a to 15d and summed together to a filter output signal v(n). This output signal v(n) of the transversal filter 12 is sent to an output terminal 16 as an output of the automatic equalizer.

The output signal v(n) is also supplied to a transmission string prediction circuit 20 and to an error calculation circuit 27 in the automatic equalizer. The transmission string prediction circuit 20 performs maximum likelihood decoding on the output signal v(n) by a maximum likelihood decoder 22 within the transient detection circuit 21 and selects the standard amplitude within the selector circuit 23 for outputting a multi-valued, such as three-valued, prediction signal for the original transmission data, that is predicted transmission data w(n)'.

Figure 4:
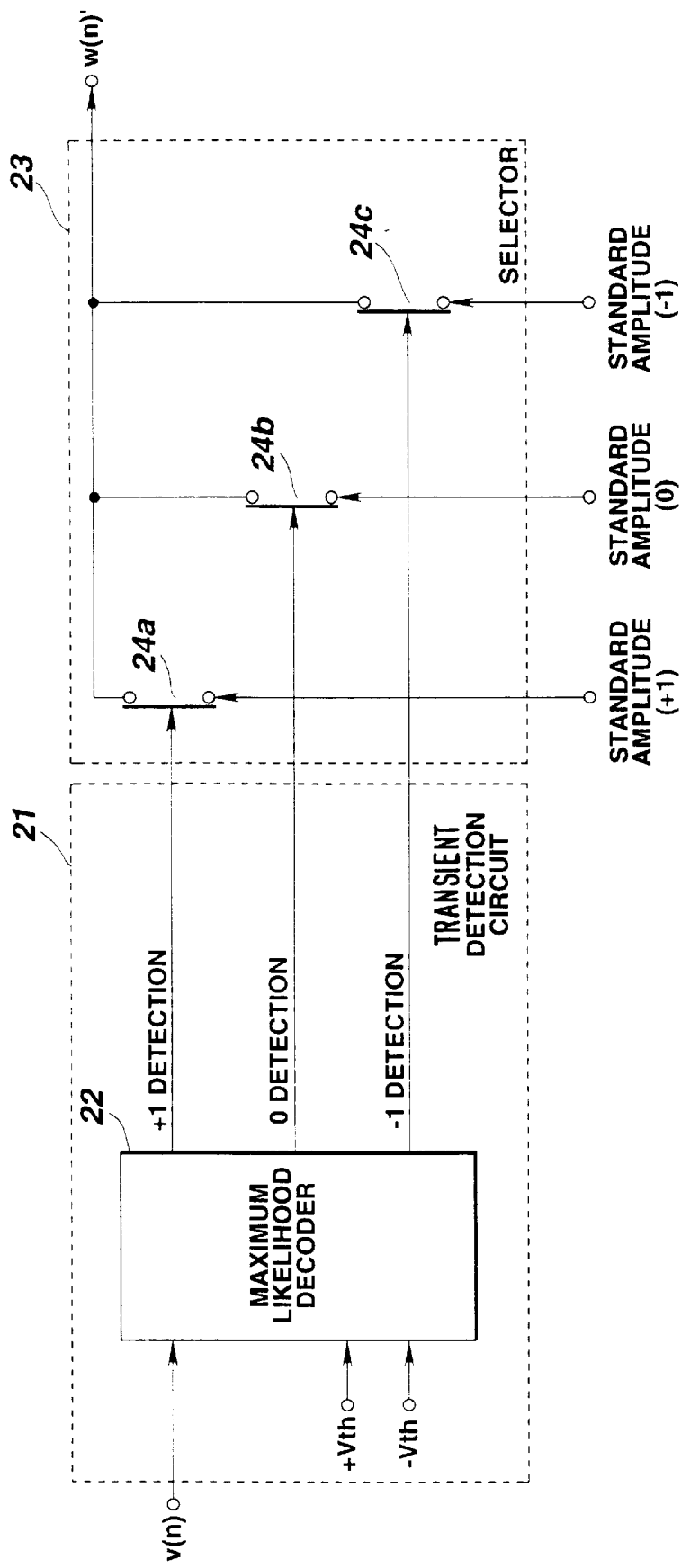
FIG. 4 shows a transmission string prediction circuit used for conversion into three-level signals according to the present invention.

FIG. 4 shows an illustrative example of the transmission string prediction circuit 20, in which a maximum likelihood decoder 22 of the transient detection circuit 21, supplied with the output signal v(n) from the transversal filter 12, performs three-value detection of +1, 0 and -1 based on pre-set threshold values +Vth and -Vth. The three-valued detection output of the maximum likelihood decoder 22 controls switches 24a, 24b and 24c of the selector 23. The switches 24a, 24b and 24c of the selector 23 are fed with standard amplitudes corresponding to three values (+1, 0 and -1) of the data. One of these switches 24a to 24c is selected responsive to the detection output of the maximum likelihood decoder 22 and the standard output of the selected value is taken out as the predicted transmission data w(n)'.

Figure 5:
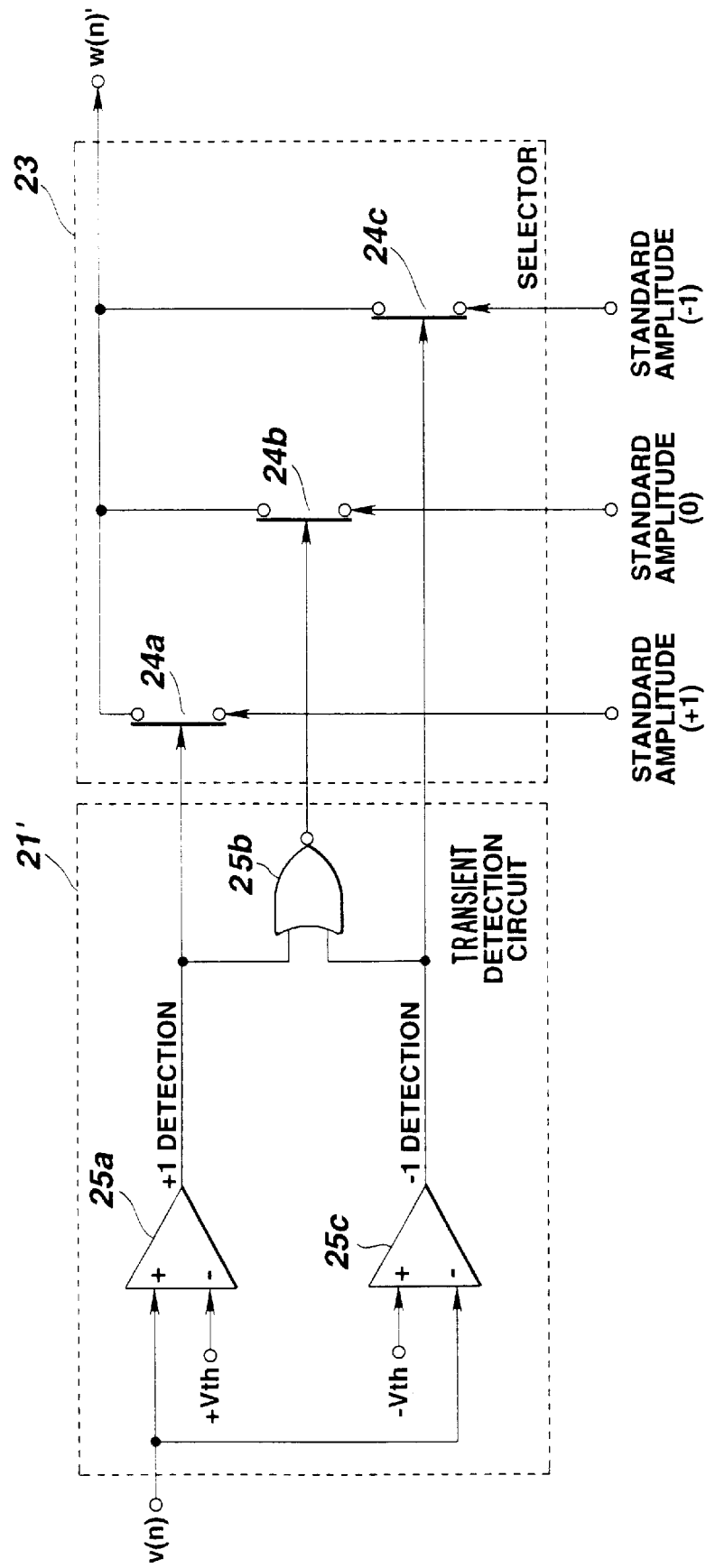
FIG. 5 shows a conventional transmission string prediction circuit for conversion to three-level signals.

FIG. 5 shows, by way of comparison, an example of a conventional transmission string prediction circuit 21' made up of a comparator 25a for level discrimination of the signal v(n) by the threshold value +Vth for outputting a +1 detection signal if the signal v(n) is not less than +Vth, a comparator 25c for level discrimination of the signal v(n) by the threshold value -Vth for outputting a -1 detection signal if the signal v(n) is not larger than -Vth, and an exclusive logical sum circuit (NOR) 25b for these detection signals. The selector 23 is configured similarly to that shown in FIG. 4. That is, the switches 24a to 24c are controlled so as to be turned on by outputs of the comparator 25a, NOR circuit 25b and by the comparator 25c, respectively. The operation by the transmission string control circuit of FIG. 5 is as explained in connection with FIG. 2A. Thus, if the standard amplitudes are +1 V, 0 V and -1 V, the threshold values +Vth and -Vth in the transient detection circuit 21' are +0.5 V and -0.5 V, respectively.

With the conventional transient detection circuit 21', transient detection errors occur frequently in the transmission system of the recording/reproducing system suffering from significant noise or equalization errors. These transient detection errors become transmission string prediction errors thus causing correction errors in the tap coefficients in turn increasing transient detection errors.

Conversely, the transient detection circuit 21 employing the maximum likelihood decoder 22 detects transmission data with high accuracy by so-called Viterbi decoding and sequential decoding. The maximum likelihood detection is directed to a required range of the signal string, irrespective of the constraint length, for reducing decoding errors produced during decoding of convolutional code, and searches for a path with the shortest Hamming distance in the supplied signal string. In Viterbi decoding, for example, unlikely paths are discarded for simplifying the search. Since the maximum likelihood decoding reduces detection errors, the above-described drawbacks of the conventional system may be eliminated for assuring satisfactory automatic equalization.

The above-described arrangements of FIGS. 4 and 5 are directed to an example of the so-called partial response class I (PRI) system. It is to be noted that the present invention can be easily applied to signals transmitted in accordance with other systems.

Referring to FIG. 3, an error calculation circuit 27 subtracts the output signal v(n) of the transversal filter 12 from the predicted transmission data w(n)' of the transmission string prediction circuit 20 containing the maximum likelihood decoding, as described above, by a subtractor 28, for calculating a predicted error e(n)'.

The prediction error e(n)' from the error calculation circuit 27 is sent to a tap coefficient calculation circuit 30 designed to calculate the tap coefficients c0(p) to c4(p) of the transversal filter 12 based on the prediction error e(n)'. Various different arrangements of the tap coefficient calculation circuit 30 of FIG. 3 may be conceived depending on the tap coefficient adjustment algorithm. FIG. 3 shows an arrangement associated with a stochastic gradient algorithm as one of such algorithms. That is, the tap coefficient calculation circuit 30 of FIG. 3 is made up of a multiplication circuit 31, an integration circuit 32 and a tap coefficient correction circuit 33. Of these circuits, the integration circuit 32 and the tap coefficient correction circuit 33 are controlled by a control circuit 35.

The multiplication circuit 31 includes a multiplier 36 for multiplying the prediction error e(n)' from the error calculation circuit 27 with a constant $\mu$, and multipliers 37a, 37b, 37c, 37d and 37e for multiplying the input signal q(n) from the input terminal 11 and the sequentially delayed signals q(n-1), q(n-2), q(n-3) and q(n-4) with an output of the multiplier 36, respectively. The signals q(n-1) to q(n-4) may be produced by delay circuits 38a, 38b, 38c and 38d for sequentially delaying the input signal q(n), as shown in FIG. 3. Alternatively, outputs of the delay circuits 13a to 13d of the transversal filter 12 may also be employed. Of course, if the delay times are not equal to each other, they cannot be used in common.

The integration circuit 32 includes adders 41a, 41b, 41c, 41d and 41e, supplied with outputs of the multipliers 37a, 37b, 37c, 37d and 37e, respectively, and flip-flops (FFs) 42a, 42b, 42c, 42d and 42e supplied with outputs of the adders 41a to 41e, respectively. Outputs of the flip-flops 42a to 42e are sent to the adders 41a to 41e, respectively, for cumulative summation. These flip-flops 42a to 42e are each fed with an enabling signal EN and a clear pulse CLR from the control circuit 35.

The tap coefficient correction circuit 33 includes adders 43a, 43b, 43c, 43d and 43e, supplied respectively with outputs of the adders 41a to 41e of the integration circuit 32, and flip-flops (FFs) 44a, 44b, 44c, 44d and 44e, supplied respectively with outputs of the adders 43a to 43e. Outputs of the flip-flops 44a to 44e are supplied respectively to the adders 43a to 43e for cumulative addition. These flipflops 44a to 44e are fed with a load pulse LD from the control circuit 35.

The operation of the above-described tap coefficient calculation circuit 30, that is, the stochastic gradient algorithm, is now explained.

For sequentially correcting the clock-timing-based tap coefficient ck(n), the following equation (6) is used:

$$c_k(n+1) = c_k(n) - \mu \frac{\partial D}{\partial c_k(n)} \quad (6)$$

The equation employs partial differentiation by the tap coefficient ck(n) for a pre-set evaluation function D.

In the above equation (6), $\mu$ is a constant the value of which is determined by the trade-off between the correct convergence to an optimum point and the speed of convergence. That is, if $\mu$ is larger, the amount of change per coefficient correction is increased, so that the time required for convergence becomes shorter. However, the performance of convergence to an optimum point becomes worse.

The above equation (6) means that the tap coefficient ck(n) is updated per data sample. If the tap coefficient is updated once per six correction operations, the tap coefficient updated every N clocks is represented as ck(p). In this case, the above equation (6) may be rewritten to:

$$c_k(p+1) = c_k(p) - \mu \frac{\partial D}{\partial c_k(\mu)} \quad (7)$$

Similarly, the above equation (2) may be rewritten to:

$$v(n) = \sum_{k=o}^{K-1} c_k(p)q(n-k) \quad (8)$$

More specified algorithms can be determined depending on which evaluation function D of the equation (7) is to be selected. An example employing the generally widely accepted least mean square error method (LMSE method) is explained. The evaluation function D of the LMSE method employs the mean square error of the above-mentioned prediction error e(n)', as shown by the following equation (9):

$$D = \sum_{n=1}^{N} (e(n)')^2 \quad (9)$$

$$= \sum_{n=1}^{N} (w(n)' - v(n))^2$$

In the equation (9), the number of data to be averaged is N. Substituting the equation (9) into the equation (8), $$D = \sum_{n-1}^{N} (e(n)')^2 \quad (10)$$

$$= \sum_{n-1}^{N} \left( w(n)' - \sum_{k=0}^{K-1} c_k(p)q(n-k) \right)^2$$

Calculating the partial differentiation of the evaluation function D of the equation (10) with respect to the first tap coefficient Ci(p), we obtain the following equation (11):

$$\frac{\partial D}{\partial c_i(p)} = -2 \sum_{n-1}^{N} q(n-i) \left( w(n)' - \sum_{k=0}^{K-1} c_k(p)q(n-k) \right) \quad (11)$$

$$= -2 \sum_{n=1}^{N} q(n-1)e(n)'$$

Converting i in the equation (11) into k, and substituting into the equation (7), we obtain the following equation (12) representing the tap coefficient modifying algorithm:

$$c_k(p+1) = c_k(p) + \mu \sum_{n-1}^{N} q(n-k)e(n)' \quad (12)$$

The above equation (12) means that the result of the input signal q(n-k) to the transversal filter 12 and the predicted error e(n)' is integrated N times and the result is used as a correction value for the tap coefficient ck(p).

The processing corresponding to the second term of the right side of the elation (12) is executed by the multiplication circuit 31 and the integration circuit 32, while the addition of the second and first terms is executed by the tap coefficient correction circuit 33. The above illustrates how calculations of the tap coefficient for automatic equalization are executed by the tap coefficient calculation circuit 30.

With the above-described automatic equalizer having the construction shown in FIG. 3, employing the maximum likelihood decoder in the transient detection circuit, transient detection accuracy may be improved, while scattering becomes less liable to occur during the operation for automatic equalization than in the conventional system. The range of possible convergence in transmission channel characteristics is increased and the pull-in range becomes broader while the time required until convergence becomes shortened to improve follow-up characteristics in case of occurrence of changes in transmission path characteristics. An optimum operation may be assured to improve noise resistance even if significant noise exists in the transmission path. In addition, the necessity for providing a known random pattern for automatic equalization is decreased.

Referring to FIG. 3, a specified example of a digital signal reproducing apparatus, employing the automatic equalizer shown in FIG. 3, is explained.

Figure 6:
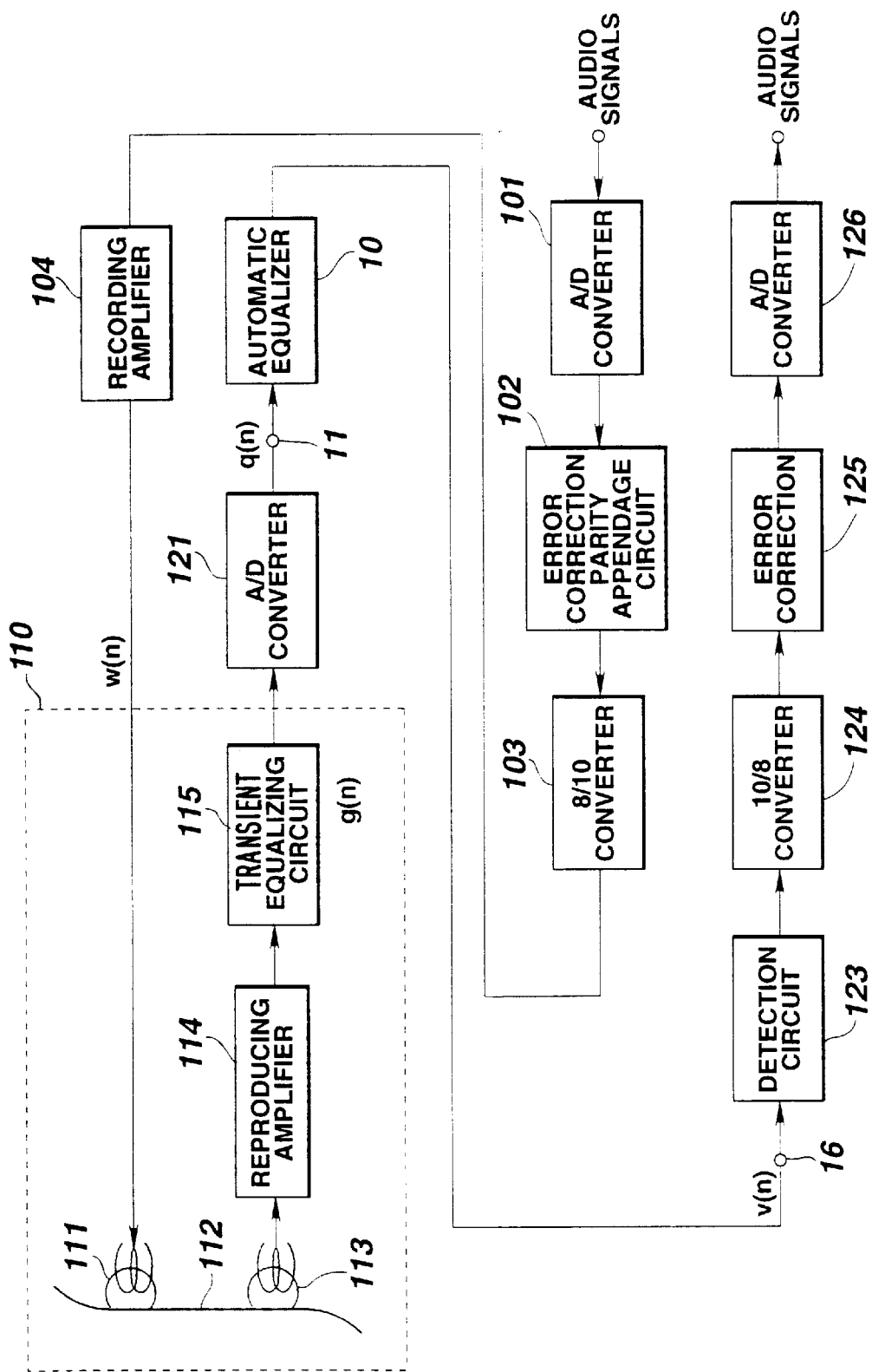
FIG. 6 is a block diagram for explanation of how the automatic equalizer of the present invention is adapted to a digital tape recording/reproducing apparatus.

FIG. 6 shows a digital audio tape recorder (DAT) as an example of a device to which is applied the above-mentioned automatic equalizer.

In FIG. 6, the audio signals to be recorded are converted by an A/D converter 101 into digital signals and added to with the error correction parity by an error correction parity addition circuit 102. The resulting signal is converted by an 8–10 converting circuit 103 from the state of 8-bit data to the state of 10 channel-bit data for recording. The resulting converted data is amplified by a recording amplifier 104 to recording data w(n).

The recording data w(n) is sent to a recording head 111 of a recording/reproducing system 110 for recording on a recording tape 112. The recording contents of the recording tape 112 are reproduced from the recording tape by a reproducing head 113. The signal from the reproducing head 113 is amplified by a reproducing amplifier 114 so as to be transiently equalized by a transient equalizing circuit 115. The components from the recording head 111 up to the transient equalization circuit 115 make up the recording/reproducing system 110. If a magnetic tape is used as the recording tape 112, a rotary magnetic head, for example, is used as each head 111, 113, while the recording/reproducing system 110 is designed as an electro-magnetic conversion system. The impulse response of the transmission channel of the recording/reproducing system 110 is g(n).

The signals from the transient equalization circuit 115 of the recording/reproducing system 110, or the so-called RF signals, are sent to an A/D converter 121 so as to be sampled with the channel clock timing and quantized for conversion into digital signals which then are sent to the input terminal 11 of the automatic equalizer 10 as the input signal q(n). An automatic equalizer configured as shown in FIG. 3 may be used as the automatic equalizer 10.

From an output terminal 16 of the automatic equalizer 10, the adaptively waveform-equalized output signal v(n) is taken out, as explained in connection with FIG. 3, so as to be supplied to a detection circuit 123. The detection circuit 123 performs transmission data detection employing the threshold value. The data resulting from 10-8 conversion by a 10-8 converting circuit 124 is sent to an error correction circuit 125 and converted by a D/A converting circuit 126 into output analog signals.

An illustrative example of the operation in case of employing an electro-magnetic conversion system having a rotary magnetic head adapted for alternately recording/reproducing Ach and Bch channels is explained by referring to FIGS. 7A to 7G.

Figure 7:
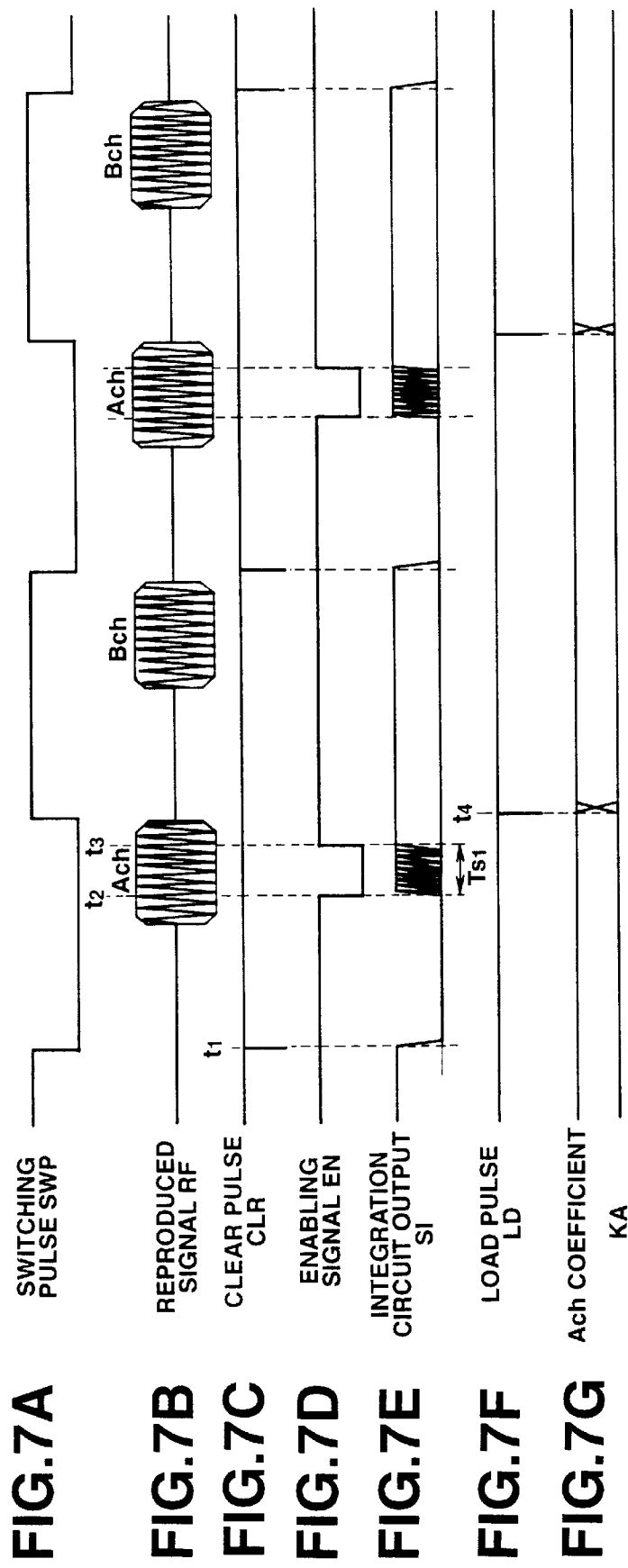
FIG. 7A is a timing chart for illustrating a switching signal SWP used for switching channels of a pair of rotary magnetic heads of a digital tape recording/reproducing apparatus.
FIG. 7B is a timing chart showing reproduced RF signals reproduced from respective channels.
FIG. 7C is a timing chart showing the waveform of clear pulses transferred from the control circuit shown in FIG. 3 to respective flip-flops.
FIG. 7D is a timing chart showing the waveform of enabling pulses transferred from the control circuit shown in FIG. 3 to the respective flip-flops.
FIG. 7E is a timing chart showing an output signal of an integration circuit shown in FIG. 3.
FIG. 7F is a timing chart showing load pulses for transferring an output of the integration circuit shown in FIG. 3 to respective flip-flops.
FIG. 7G is a timing chart showing the rewriting timing of rewriting an Ach coefficient based on the transferred load pulses.

FIG. 7A shows a switching pulse SWP for switching between the channels Ach and Bch of the rotary magnetic head. Each magnetic head reproduces the recorded signals during a time interval substantially corresponding to a one-fourth period of head rotations. The reproduced signal RF becomes a signal shown in FIG. 7B. FIGS. 7D to 7G show an illustrative operation for the channel Ach. The operation for automatic equalization is performed in a stabilized portion of the playback signal, such as during a period $T_{SI}$ between time points t2 and t3 excluding the forward and backward unstable portions of the reproduced signal for the channel Ach.

The clear pulse CLR and the enable signal EN in FIGS. 7C and 7D are sent from the control circuit 35 of FIG. 3 to the flip-flops 42a to 42e in the integration circuit 32 in the tap coefficient calculation circuit 30. The clear pulse CLR is issued at a decay timing t1 of the switching pulse SWP, while the enable signal EN is active or "L" only during the period $T_{SI}$ during which the reproducing signal RF remains stable. Consequently, the output of the integration circuit 32 is as shown at SI for an integrating circuit output in FIG. 7E. The integrating operation occurs only during the above-mentioned enabling period $T_{SI}$.

The number of times of the integration operations Ns during the enabling period $T_{SI}$ is the period $T_{SI}$ divided by the channel clock period $T_{ch}$ (Ns=$T_{SI}/T_{ch}$). As an illustrative example, if, with the channel clock frequency fch of 9.4 MHz, and the channel clock period Tch of approximately 106 ns, the period of outputting of the reproduced signal on the channel Ach, that is the period substantially equal to one-fourth the period of head rotation, is approximately 7.5 ms, and the mid one-half portion of the 7.5 ms period, that is a 3.75 ms period, represents the above enabling period $T_{SI}$, the ratio $T_{SI}/T_{ch}$ is approximately 3.75 ms/106 ns, so that the number of times of the integrating operations is approximately 35377.

The result of integration obtained by this integrating operation is sent to the tap coefficient correction circuit 33 of FIG. 3 and the load pulse LD is issued at time t4 posterior to time t3 so that the results of integration are loaded on the flip-flops 44a to 44e of the tap coefficient correction circuit 33. The result is that the Ach coefficient KA, equivalent to the tap coefficients c0(p) to c4(p) concerning Ach, is switched at time t4. Meanwhile, the load pulse LD is a pulse used for correcting the tap coefficient ck(p), and tap coefficient correction should be performed during the period when the reproduced RF signal for the Ach channel is as yet not produced. Therefore, the load pulse LD is generated directly after outputting of the Ach reproduced signal has come to a close, as shown in FIG. 7G.

In the above-described embodiment, the maximum likelihood decoder is used in the transient detection circuit in the automatic equalizer. However, in actuality, the maximum likelihood decoder is used as a detection circuit for the reproducing circuit system. In such case, it may be contemplated to use the maximum likelihood detector as the transient detection circuit.

Figure 8:
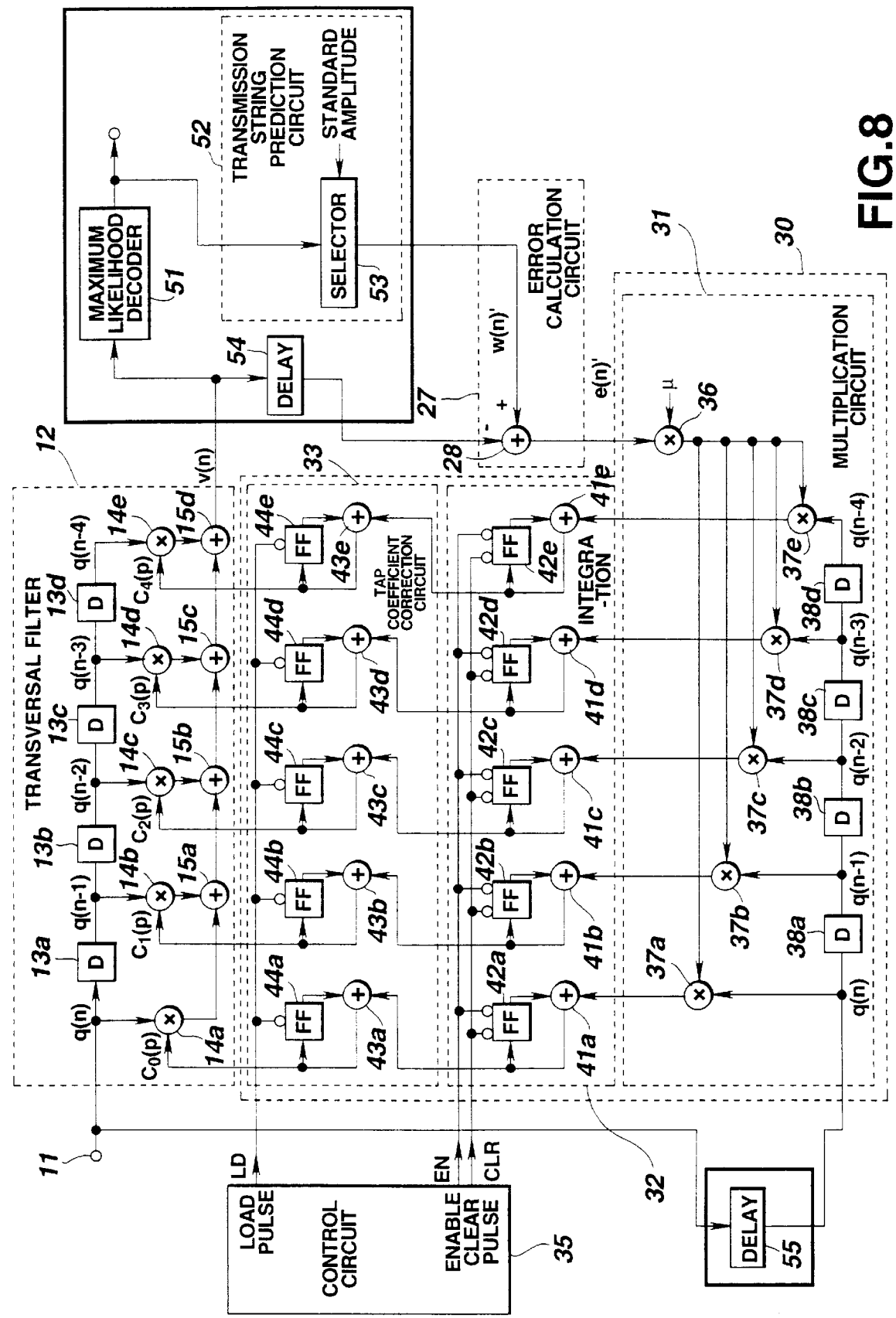
FIG. 8 is a block diagram showing a second embodiment of the automatic equalizer according to the present invention.

FIG. 8 shows an automatic equalizer as a second embodiment of the present invention. The automatic equalizer has a maximum likelihood decoder 51 as a detection circuit in the reproducing circuit corresponding to the detection circuit 21 shown in FIG. 4.

Referring to FIG. 8, an output v(n) from the transversal filter 12 of the automatic equalizer is supplied to the maximum likelihood decoder 51 as a detection circuit. In order to use the maximum likelihood decoder 51 simultaneously as a transient detection circuit in the transmission string prediction circuit, an output of the maximum likelihood decoder 51 is sent to a selector 53 of the transmission string prediction circuit 52. That is, the transmission string prediction circuit 52 of the embodiment of FIG. 8 is made up only of the selector 53.

The major portion of the structure of FIG. 8 is basically the same as the structure shown in FIG. 1. However, the maximum likelihood decoder 51 has an internal bus memory for so-called Viterbi decoding, so that a pre-set delay time has to elapse until outputting of the result of detection. This delay time is termed an A-channel clock period. Delay circuits 54, 55 are provided for correcting the delay time A and for timing matching in making error and tap coefficient calculations.

That is, the output v(n) of the transversal filter 12 is sent to a delay circuit 54 having the delay time A, and an output v(n-A) of the delay circuit 54 is sent to the subtractor 28 of the error calculation circuit 27 for subtraction from an output of the selector 53 of the transmission string prediction circuit 52. Also, the input signal q(n) from the input terminal 11 is sent to and delayed by the delay circuit 55 having the delay time A, and an output q(n-A) of the delay circuit 55 is sent to a delay circuit 38a and a multiplier 37a in the multiplication circuit 31 in the tap coefficient calculation circuit 30. Outputs of the delay circuits 38b, 38c and 38d in the multiplication circuit 31 are represented as q(n-A-1), q(n-A-2), q(n-A-3) and q(n-A-4), respectively.

The remaining portions of the structure of FIG. 8, similar to those of FIG. 3, are indicated by the same reference numerals and the corresponding description is omitted for simplicity.

In FIG. 8, the points of difference from FIG. 3 are indicated by bold lines.

In the embodiment of FIG. 8, the effect similar to that in the embodiment of FIG. 3 is obtained. In addition, since the maximum likelihood decoder 51, used as a detection circuit in the reproducing apparatus, is used simultaneously as a transient detection circuit, the circuit structure is simplified and the production cost lowered.

Meanwhile, in the embodiment of the present invention, shown in FIG. 8, the algorithm shown in the following equation (13):

$$c_k(p+1) = c_k(p) + d \text{ for } S_k \geq 0$$

$$c_k(p+1) = c_k(p) - d \text{ for } S_k < 0 \tag{13}$$

is used in place of that of the equation (12) for tap coefficient correction.

In the equation (13), $S_k$ means the term of $\Sigma$ in the equation (12), that is $$S_k = \sum_{n=1}^{N} q(n-k) e(n)' \tag{14}$$

On the other hand, the correction amount d in the tap coefficient correction unit in the equation (13) is a constant for correcting the tap coefficient $c_k(p)$ once and, for example, the LSB portion of the coefficient may be used as a unit correction amount d.

In the equation (13), the correction amount for tap coefficient is d, irrespective of the magnitude of the term $S_k$. That is, $S_k$ is used only as the two-level information indicating whether the next tap coefficient is to be increased or decreased by d.

In general, $S_k$ ceases to be changed at a time point of convergence of the automatic equalization circuit. However, since it is changed in the present system by d each time, the converted coefficient alternately assumes a converged value +d and another converged value −d. However, this poses no problem if the correction amount d is sufficiently small as compared to the absolute value of the coefficient, since the effect on the equalization characteristics of the system is negligibly small even if the tap coefficient continuously fluctuates in a range of ±d.

Since $S_k$ is used in the equation (13) only as the bi-level information indicating the increase or decrease of the next coefficient, it is possible to take out at least one of the signs before multiplication. As the conditions to be taken into consideration, one of $Se_q$, $Sq_k$ and $Sqe_k$ defined by the following equations (15), (16) and (17):

$$Se_k = \sum_{n=1}^{N} q(n-k) \text{ (code of } e(n)') \tag{15}$$

$$Sq_k = \sum_{n=1}^{N} \text{ (code of } q(n-k)) \, e(n)' \tag{16}$$

$$Sqe_k = \sum_{n=1}^{N} \text{ (code of } q(n-k)) \tag{17}$$

(code of $e(n)'$)

may be used.

The results of multiplication by these equations are corrupted by quantization errors produced at the time of taking out the code or rounding into code. However, these quantization errors, which are random noise components, disappear by integration or averaging, such that the inherent signal component of $S_k$ causing the coefficient to be increased or decreased is left in the results of integration and hence $Se_q$, $Sq_k$ and $Sqe_k$ can be used for condition judgment of the equation (13).

Figure 9:
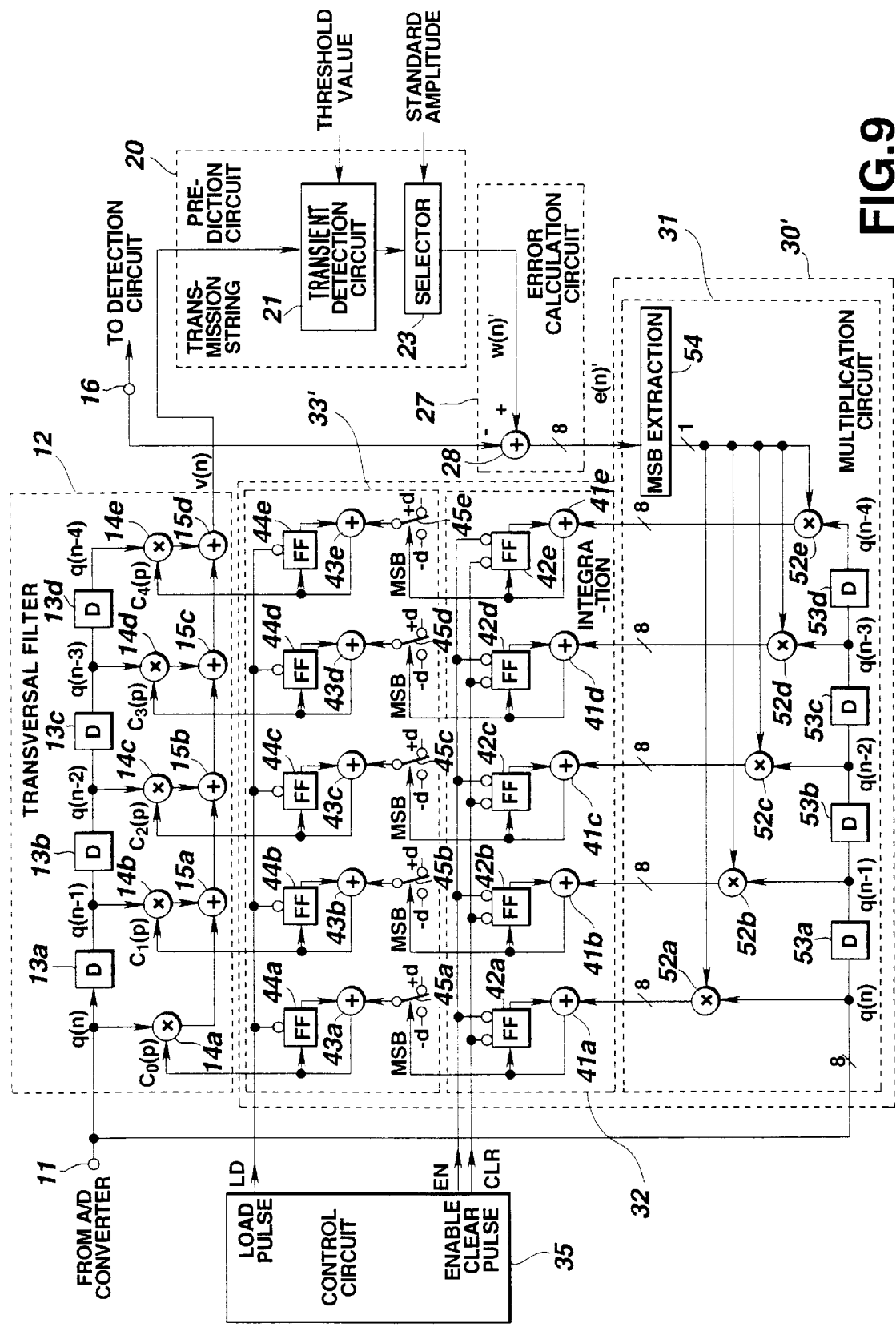
FIG. 9 is a block diagram showing a third embodiment of the automatic equalizer according to the present invention.

For realization of the above-mentioned algorithm shown in equation (13), $Se_k$ is used for condition judgment in a tap coefficient calculation circuit 30' of FIG. 9. That is, the multiplication circuit 51 takes out the MSB (sign bit) of the prediction error $e(n)'$ by MSB extracting means 54 and sends the MSB to multipliers 52a, 52b, 52c, 52d and 52e corresponding to the multipliers 37a, 37b, 37c, 37d and 37e of FIG. 3. The MSB extraction means 54 may be realized by coupling only the MSB on the data bus of the error calculation circuit 27 to the multipliers 52a to 52e without the necessity of providing a separate circuit.

The integration circuit 32, fed with outputs of the multipliers 52a to 52e of the multiplication circuit 51, is similar to the integration circuit 32 of FIG. 2. However, the next tap coefficient correction circuit 33' is configured for taking out the MSBs (sign bits) of the respective outputs of the integration circuit 32 for controlling changeover switches 45a, 45b, 45c, 45d and 45e designed for switching between +d and −d. Outputs of these changeover switches 45a to 45e are sent to the adders 43a, 43b, 43c, 43d and 43e, respectively.

The arrangement of FIG. 9 is otherwise the same as that of FIG. 3. Therefore, the tap coefficient algorithm by the tap coefficient calculation circuit 30' of FIG. 9 is as shown by the following equation (18):

$$C_k(p+1) = c_k(p) + d \text{ for } Se_k \geq 0$$

$$C_k(p+1) = c_k(p) - d \text{ for } Se_k < 0 \tag{18}$$

If the word length or word width of the input signal $q(n)$ and the output signal $v(n)$ is 8 bits, the multipliers 37a to 37e of the configuration of FIG. 3 becomes an 8×8 bit multiplier. However, with the structure of FIG. 9, a 1×8 bit multiplier suffices for each of the multipliers 52a to 52e, thus enabling the circuit scale to be reduced. The result is saving in power consumption and in inexpensive production cost.

Meanwhile, if the equalization error is larger, larger coefficient correction needs to be made at a time resulting in a larger value of $S_k$. With the algorithm shown in the equation (18), the correction amount per correction is d, so that some convergence time is involved. However, this poses no practical problem. That is, if the bit length of the tap coefficient is 8 bits, d is the LSB and the initial value of the coefficient is 0, convergence ia achieved by a maximum of 128 coefficient correction operations, given the maximum value of the coefficient of 128. The time involved in coefficient correction of 128 circuits is a practically allowable value 3.81 seconds for 128 revolutions, if each revolution is achieved in 30 ms, even assuming that the automatic equalizer is applied to DAT and a correction is performed per revolution of the rotary drum.

Figure 10:
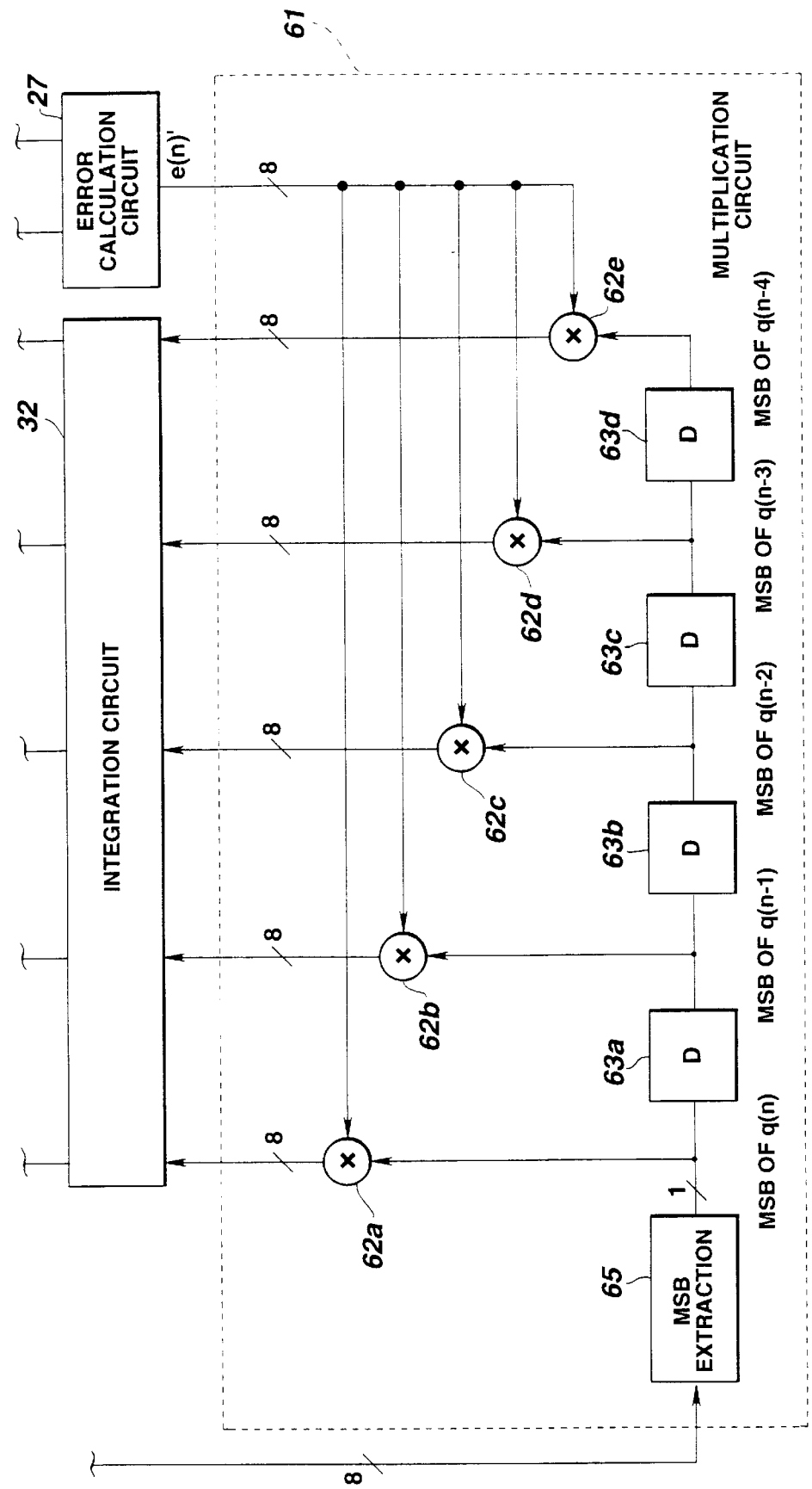
FIG. 10 is a block diagram showing a first embodiment of a multiplication circuit of the automatic equalizer according to the present invention.

FIG. 10 shows essential portions of the second embodiment of the present invention. The condition judgment is done by $S_k$ and tap coefficient correction is executed in accordance with the following equation (19):

$$c_k(p+1) = c_k(p) + d \text{ for } Sq_k \geq 0$$

$$c_k(p+1) = c_k(p) - d \text{ for } Sq_k < 0 \tag{19}$$

That is, the multiplication circuit 61 of FIG. 10 routes the prediction error $e(n)'$ from the error calculation circuit 27 to multipliers 62a, 62b, 62c, 62d and 62e corresponding to the multipliers 37a, 37b, 37c, 37d and 37e of FIG. 3, respectively, while taking out the MSB (sign bit) of the input signal $q(n)$ from the MSB extraction means 65 and routing the MSB to delay circuits 63a, 63b, 63c and 63d corresponding to the delay circuits 38a, 38b, 38c and 38d of FIG. 3. The structure of FIG. 10 is otherwise the same as that of FIG. 9 and hence detailed description is omitted for simplicity.

Figure 11:
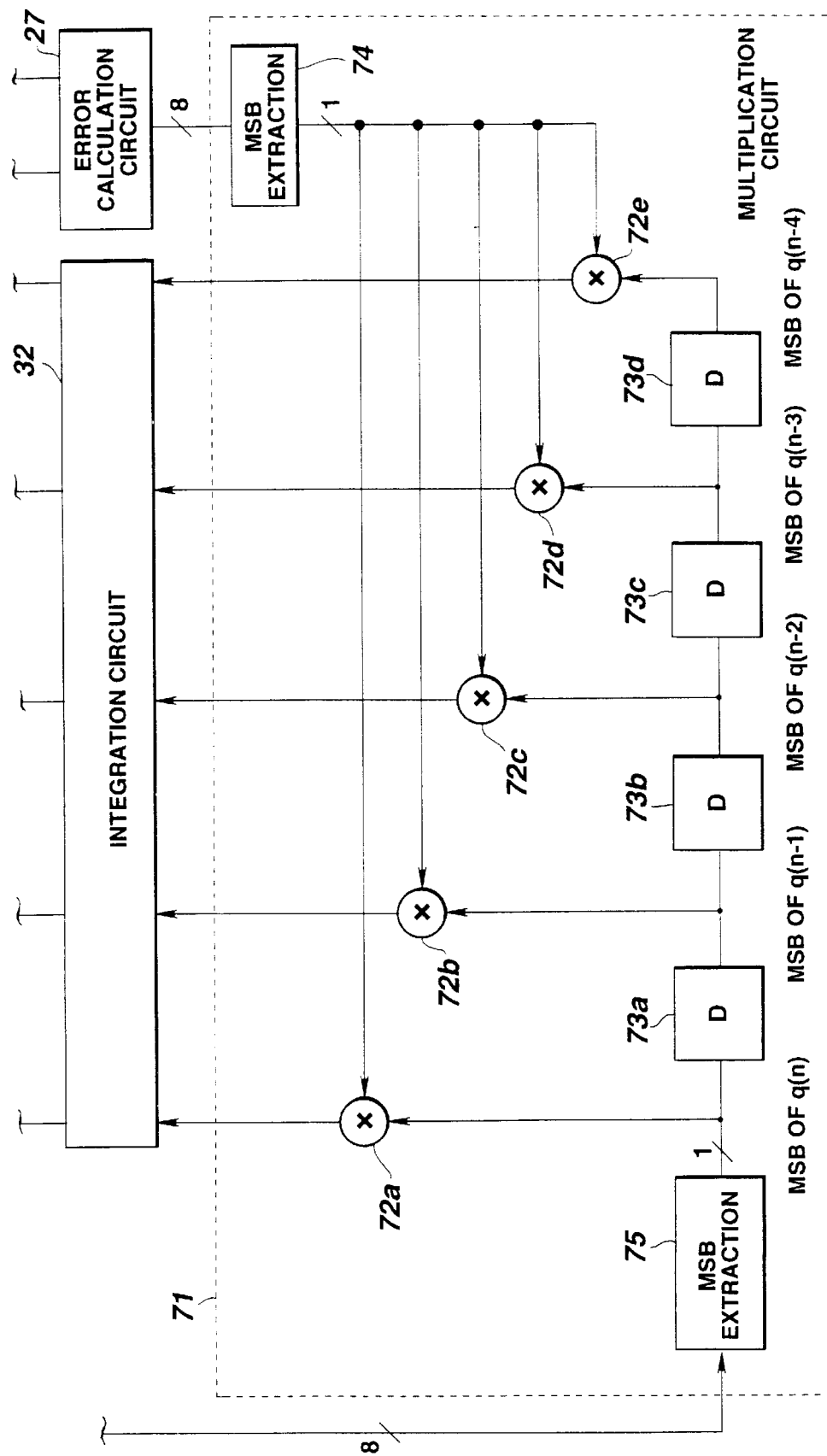
FIG. 11 is a block diagram showing a second embodiment of a multiplication circuit of the automatic equalizer according to the present invention.

In the embodiment of FIG. 11, the number of bits for multiplication in the multipliers 72a to 72e can be diminished such that only an 8×1 multiplier is required, and hence the circuit scale can be reduced to contribute to low production cost and saving in power consumption.

FIG. 11 shows essential portions of the third embodiment of the present invention. The condition judgment is done by $Se_k$ and tap coefficient correction is executed in accordance with the following equation (19):

$$c_k(p+1) = c_k(p) + d \text{ for } Sqe_k \geq 0$$

$$c_k(p+1) = c_k(p) - d \text{ for } Sqe_k < 0 \qquad (20)$$

That is, the multiplication circuit 71 of FIG. 11 extracts the MSB of the prediction error e(n)' from the error calculation circuit 27 from MSB extraction means 74 and routes the MSB to multipliers 72a, 72b, 72c, 72d and 72e corresponding to the multipliers 37a, 37b, 37c, 37d and 37e of FIG. 3, respectively, while taking out the MSB (sign bit) of the input signal q(n) from the MSB extraction means 75 and routing the MSB to delay circuits 73a, 73b, 73c and 73d corresponding to the delay circuits 38a, 38b, 38c and 38d of FIG. 3. The structure of FIG. 10 is otherwise the same as that of FIG. 9 and hence detailed description is omitted for simplicity.

With the embodiment of FIG. 11, 1×1 bit multipliers may be used as the multipliers 72a to 72e so that only logic circuits can be used to reduce the circuit scale significantly.

The MSB extraction means 65, 74 and 75 of FIGS. 10 and 11 may be eliminated as separate circuits and only MSBs may be sent by corresponding circuit connection.

The present invention is not limited to the above-described embodiments. For example, the recording/reproducing system as constituting the transmission path is not limited to the digital audio tape recorder but a digital VTR or a disc recording/reproducing system may be employed. The transmission/reception system may also be used as a transmission path. In addition, three or more correction amounts may be provided and switched for selection.

We claim:

1. An automatic equalization apparatus comprising:
   filter means for convolving an input digital signal with a plurality of coefficients fed thereto;
   transmission string prediction means including a maximun likelihood decoder for performing maximum likelihood decoding on an output signal of said filter means based on pre-set threshold values for producing a multi-level signal, and selection means for selecting an amplitude level from said multi-level signal and for predicting values of an original input signal;
   error calculation means for calculating a prediction error based on said amplitude level selected by said selection means of said prediction means; and
   coefficient generating means for generating said plurality of coefficients fed to said filter means based on results of calculations by said error calculation means, wherein said coefficient generating means includes:
      first multiplication means for multiplying said prediction error from said error calculation means with a pre-set constant,
      second multiplication means for multiplying said input digital signal with a result of multiplication by said first multiplication means,
      integration means for integrating an output of said second multiplication means, and
      coefficient correction means for correcting said plurality of coefficients fed to said filter means based on an integrated value output from said integration means.

2. The automatic equalization apparatus as claimed in claim 1, wherein said filter means comprises a multi-stage transversal filter and said plurality of coefficients are provided respectively to a plurality of stages of said transversal filter.

3. The automatic equalization apparatus as claimed in claim 1, further comprising delay means for transiently delaying said output signal of said filter means, wherein a delay amount of said delay means corresponds to a time required for performing said maximum likelihood decoding by said transmission string prediction means.

4. The automatic equalization apparatus as claimed in claim 1, further comprising delay means for transiently delaying said input digital signal of said filter means, wherein a delay amount of said delay means corresponds to a time required for performing said maximum likelihood decoding by said transmission string prediction means.

5. The automatic equalization apparatus as claimed in claim 1, wherein said coefficient generating means generates at least two of said plurality of coefficients based on the results of calculating by said error calculation means.

6. The automatic equalization apparatus as claimed in claim 5, wherein said plurality of coefficients fed to said filter means are selectively generated based on a sign of the prediction error calculated by said error calculation means.

7. The automatic equalization apparatus as claimed in claim 5, wherein said plurality of coefficients fed to said filter means are selectively generated based on a sign of said input digital signal.

8. The automatic equalization apparatus as claimed in claim 5, wherein said plurality of coefficients fed to said filter means are selectively generated based on a sign of the prediction error calculated by said error calculation means and on a sign of said input digital signal.

9. A digital signal reproducing apparatus comprising:
   filter means for convolving an input digital signal with a plurality of coefficients;
   transmission string prediction means including a maximun likelihood decoder for performing maximum likelihood decoding on an output signal of said filter means based on pre-set threshold values for producing a multi-level signal, and selection means for selecting an amplitude level from said multi-level signal and for predicting values of an original input signal;
   error calculation means for calculating a prediction error based on said amplitude level selected by said selection means of said prediction means and said output signal of said filter means;
   coefficient generating means for generating said plurality of coefficients fed to said filter means based on results of calculation by said error calculation means, wherein said coefficient generating means includes:
      first multiplications means for multiplying said prediction error from said error calculation means with a pre-set constant,
      second multiplication means for multiplying said input digital signal with a result of multiplication by said first multiplication means,
      integration means for integrating an output of said second multiplication means, and
      coefficient correction means for correcting said plurality of coefficients fed to said filter means based on an integrated value of said integration means;
   detection means for detecting original data based on said output signal of said filter means; and
   error correction means for correcting errors of data detected by said detection means.

10. The digital signal reproducing apparatus as claimed in claim 9, wherein said filter means comprises a multi-stage transversal filter and said plurality of coefficients are provided respectively to a plurality of stages of said transversal filter.

11. The digital signal reproducing apparatus as claimed in claim 9, further comprising delay means for transiently delaying said output signal of said filter means, wherein a delay amount of said delay means corresponds to a time required for performing said maximum likelihood decoding by said transmission string prediction means.

12. The digital signal reproducing apparatus as claimed in claim 9, further comprising delay means for transiently delaying said input digital signal of said filter means, wherein a delay amount by said delay means corresponds to a time required for performing said maximum likelihood decoding.

13. The digital signal reproducing apparatus as claimed in claim 9, wherein said coefficient generating means generates at least two of said plurality of coefficients based on results of calculations by said error calculation means.

14. The digital signal reproducing apparatus as claimed in claim 9, wherein said plurality of coefficients fed to said filter means are selectively generated based on a sign of the prediction error from said error calculation means.

15. The digital signal reproducing apparatus as claimed in claim 9, wherein said plurality of coefficients fed to said filter means are selectively generated based on a sign of said input digital signal.

16. The digital signal reproducing apparatus as claimed in claim 9, wherein said plurality coefficients fed to said filter means are selectively generated based on a sign of the prediction error calculated by said error calculation means and on a sign of said input digital signal.

\* \* \* \* \*